Sept. 5, 1967 I. J. P. JAMES 3,340,356

TELEVISION CAMERAS

Filed Nov. 7, 1963 2 Sheets-Sheet 1

United States Patent Office 3,340,356
Patented Sept. 5, 1967

3,340,356
TELEVISION CAMERAS

Ivanhoe John Penfound James, Ealing, London, England, assignor to Electric & Musical Industries Limited, Hayes, England, a company of Great Britain Filed Nov. 7, 1963, Ser. No. 322,187
Claims priority, application Great Britain, Nov. 9, 1962, 42,515/62
6 Claims. (Cl. 178—5.4)

The present invention relates to television cameras and is especially, but not exclusively, suited to cameras for colour television.

It is a well known difficulty with television camera pick-up tubes that the finite size of the scanning spot leads to a loss of resolution of the image by the tube and to a reduciton of the higher frequency components of the video signal produced. Furthermore, in pick-up tubes of the photo-conductive type a further loss of resolution occurs owing to lateral conduction through the photo-conductive medium.

It is an object of the present invention to provide means for compensating at least in part for the loss of resolution of the image in a television pick-up tube.

According to one aspect of the present invention there is provided a colour television camera arrangement comprising means for producing at least two images of a scene, a luminance television pick-up tube which produces a brightness signal of relatively high resolution in response to one of said images, one or more other television pick-up tubes each responsive to a respective other one of said images to produce a plurality of signals representing the colour components of the scene at relatively low resolution means for combining said colour signals to produce a brightness signal of relatively low resolution, and means for subtracting from said high resolution signal a proportion of said low resolution signal of smaller amplitude than said high resolution signal thereby to produce from said subtracting means an output brightness signal in which edges and transitions are emphasised.

According to a feature of the invention said subtracting means comprises a subtractor to which said low resolution and said high resolution signals, both of the same amplitude, are applied to produce a difference signal and an adder for adding to said high resolution signal a proportion of said difference signal.

Figure 1:
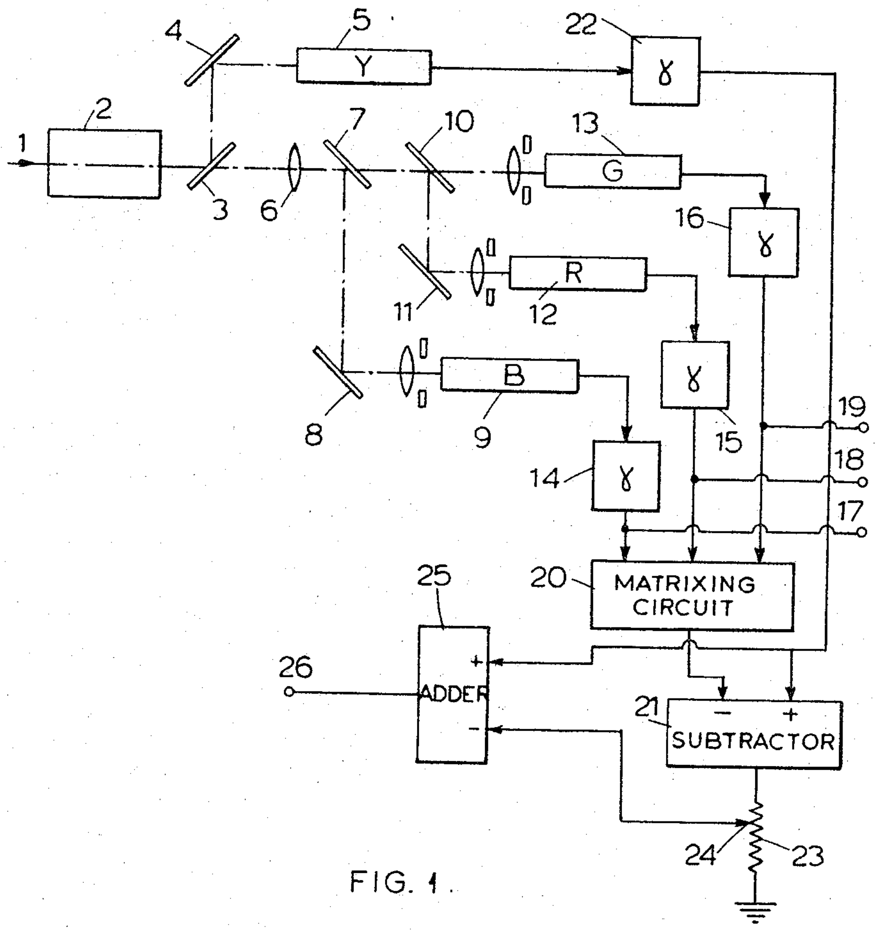
Figure 2:
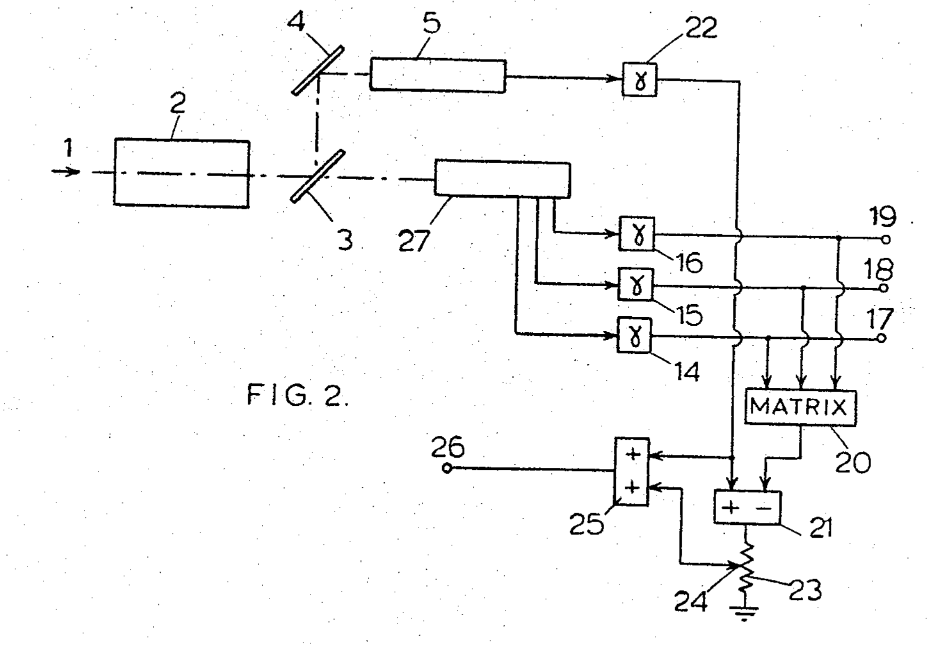

In order that the invention may be fully understood and readily carried into effect it will now be described in greater detail with reference to the accompanying drawings of which:

FIGURE 1 represents in diagrammatic form one example of a television camera according to the invention, FIGURE 2 represents in diagrammatic form a second example of a television camera according to the invention, and FIGURE 3 represents waveforms illustrative of the examples of the invention shown in FIGURES 1 and 2.

Referring to the drawing, FIGURE 1 illustrates a four tube colour television camera, one of the tubes of which is a luminance pick-up tube for generating the signal representing the luminance of a scene, the light from which is represented by the arrow 1 and the three other of which tubes are colour pick-up tubes. In the example illustrated the luminance pick-up tube 5 is a 4½" image orthicon tube and the three colour pick-up tubes 9, 12 and 13 are each vidicon tubes which respectively produce signal outputs representing the blue, red and green components. The camera may for example be used with transmitting apparatus which transmits a video waveform including components denoted by $$Y^{\frac{1}{\gamma}},\ R^{\frac{1}{\gamma}}-Y^{\frac{1}{\gamma}} \text{ and } B^{\frac{1}{\gamma}}-Y^{\frac{1}{\gamma}}$$

The brightness signal may take forms other than $$Y^{\frac{-1}{\gamma}} \text{ for example } Y_W^{\frac{1}{\gamma}}-\Delta_L$$

where $$\Delta_L=Y_N^{\frac{1}{\gamma}}-Y'_N$$

the suffices W and N indicating wide and narrow band signals respectively. According to the invention the brightness signal in this example is modified to be $$Y_W^{\frac{1}{\gamma}}-\Delta_L-\Delta_{LW} \text{ where } \Delta_{LW}=a\left(Y_W^{\frac{1}{\gamma}}-Y_N^{\frac{1}{\gamma}}\right)$$

$a$ being a constant.

In practical forms of the camera represented in FIGURE 1, the three vidicon pick-up tubes 9, 12 and 13 may have their axes in a common horizontal plane and the image orthicon pick-up tube 5 may be located above them. The axes of all the tubes are, however, represented as being in one common plane in the drawings. The camera has a zoom lens 2, for example, of the kind shown as the "Varotal III," manufactured by the Rank Taylor-Hobson Division of the Rank Organisation, Leicester, England. The back-focus of the lens is approximately 12" and the axial beam from the exit aperture of the lens, after reflection by a mirror 3 which is of smaller diameter than the beam from the lens 2 and is equivalent to a $F/8$ aperture, is reflected by another mirror 4 to the target of the pick-up tube 5. The axis of the tube 5 is parallel to that of the lens 2. An annular portion of the beam from the lens 2 does not impinge on the mirror 3 and forms a real image about 12" away from the lens 2, which image is focused by the transfer lens 6, which is an 8" lens, to the colour analysing section of the camera. This section of the camera comprises in addition to the tubes 9, 12 and 13, the reflecting mirrors 8 and 11 and the dichroic mirrors 7 and 10. The mirror 7 reflects the blue component of the light via a mirror 8 to the target of the pick-up tube 9. The red and green components of the light are transmitted by the mirror 7 to the mirror 10 which reflects the red part of the light via the mirro 11 to the red pick-up tube 12. The green part of the incident light is transmitted by the mirror 10 directly to the target of the green pick-up tube 13. The vidicons 9, 12 and 13 have objective lenses of $F/1.4$ aperture and a focal length of 8 centimeters.

The focal lengths of the various lenses of the camera are arranged to produce images of the appropriate sizes for the different pick-up tubes 5, 9, 12 and 13. A field lens may be placed at the real image plane of the lens 2 to produce a more even field illumination of the colour pick-up tube targets. Field masks may also be provided in front of the tubes 9, 12 and 13 to form a sharp surround to the images formed on the targets of the colour pick-up tubes so as to reduce tube effects.

The mirror 3 is a front surface mirror and is of smaller size than the axial beam of the lens 2 at the position at which it is placed, the mirror 3 being on the axis of the lens 2 so that the light fed to the luminance pick-up tube 5 is gathered only from the axial zone of the lens 2, thereby ensuring the maximum resolution from the pick-up tube 5. The lens 2 is, however, computed for operation with apertures of about $f/4$ and is normally operated at about this aperture. Light passing through the marginal zone of the objective can therefore pass the mirror 3 to the colour section of the camera. It is known that, for colour reproduction the colour information can be of a lower order of resolution or definition than the luminance information and therefore, if by reason of the fact that the marginal zone of the relatively wide aperture objective is used to form the images on the targets of the colour pick-up tubes 9, 12 and 13, the resolution of the colour component images is relatively poor for parts of the scene, this does not produce any undesirable deterioration of the reproduced picture. Moreover the light intensity which can be produced by this arrangement at the targets of the tubes 9, 12 and 13 is sufficient to reduce the lag of the tubes to an acceptable level.

The colour component signals from the pick-up tubes 9, 12 and 13 are gamma corrected in respective circuits 14, 15 and 16 and transmitted to output terminals 17, 18 and 19 for further processing to produce the colour television waveform for transmission. The outputs of the circuits 14, 15 and 16 are also applied to a matrixing circuit 20 which re-combines the colour components to produce a low resolution luminance component. This low resolution luminance signal is applied to one input of a subtractor 21. The luminance video signal from the pick-up tube 5 which is of relatively high resolution after gamma correction in the circuit 22 is applied to the second input of the subtractor 21 which produces an output signal equal to the difference between the high resolution signal from the tube 5 and the low resolution video signal from the tubes 9, 12 and 13. The input signals of the subtractor 21 are arranged to be of equal amplitude so that the output signal of the subtractor 21 is zero for a constant intensity input to the camera. The output signal of the subtractor 21 is set up across a potentiometer 23, the wiper 24 of which is connected to one input of an adder 25, to the other input of which the high resolution video signal from the tube 5 is applied. The output signal of the adder 25 is applied to the output terminal 26 for the luminance video signal.

Figure 3A:
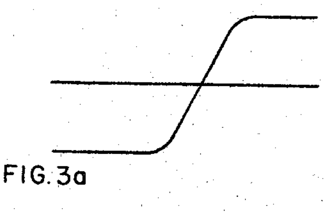
Figure 3B:
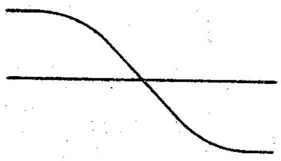
Figure 3C:
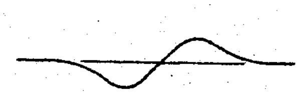
Figure 3D:
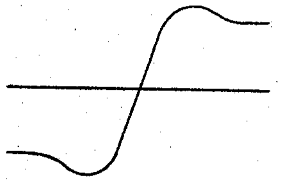

In order to explain the operation of FIGURE 1 reference will now be made to FIGURE 3 in which the waveform *a* represents the output of the tube 5 in response to a particular light transition, the waveform *b* represents the inverse of the output of the matrixing circuit 20 in response to the same transition. From a comparison of the waveforms *a* and *b* the lower resolution of the video signal from the matrixing circuit 20 appears as a shallower slope in the waveform *b*. The sum of the waveforms *a* and *b* is given at *c* which is, of course, the output of the subtractor 21. When the output of the subtractor as shown at *c* is added to the high resolution video signal *a* from the tube 5 in the adder 25, the waveform *d* results. The waveform in FIGURE 3*d* shows not only a steeper rise than that of FIGURE 3*a* but also includes a small amount of over swing which tends to enhance the apparent sharpness of the edge to be reproduced from the waveform.

This crispening of the edges also takes place in the vertical direction, that is from line to line, because the resolving power of the tubes 9, 12 and 13 is lower than that of the tube 5 in the vertical direction as well as horizontally.

A potentiometer 23 is provided so that the proportion of the difference signal from the subtractor 21 which is added to the high resolution video signal from the tube 5 in the adder 25 may be varied. With the wiper 24 at the grounded end of the potentiometer 23 none of the difference signal is added and there is no increase in crispness of the edges of the video waveform from the tube 5. As the proportion of the difference signal is increased so the edges become progressively more sharp. An advantage of the arrangement described is that the amount of crispness added to the edges of the video waveform may be varied without varying the gain of the camera.

FIGURE 2 shows an arrangement similar to that of FIGURE 1 in which the separate colour pick-up tubes 9, 12 and 13 are replaced by a single colour vidicon 27. A tube of this type was described in the transactions of the Institute of Radio Engineers on Electron Devices, for July 1960, by Weimer and others. This pick-up tube includes strip colour filters and a target electrode divided into strips, there being approximately 900 strips in the tube. The tube 27 produces the three colour signals simultaneously and the separate outputs are treated in the same way as the outputs of the separate colour pick-up tubes 9, 12 and 13 of FIGURE 1. The remainder of FIGURE 2 is similar to FIGURE 1 and components of FIGURE 2 which are identical with those of FIGURE 1 carry the same reference numerals.

In an alternative arrangement the apparatus described in British Patent 714,514 may be used in place of the three vidicons 9, 12 and 13 of FIGURE 1 or the colour vidicon 27 of FIGURE 2.

The arrangement is not limited to the use of image orthicon and vidicon pick-up tubes as described above. In particular, the plumbicon pick-up tube may be used in place of both image orthicon and vidicon tubes. The invention is of particular value in the case of cameras using plumbicon tubes in which the resolution tends to be layer-limited.

The gamma correction circuits 14, 15 16 and 22 may take any known form. Many forms of circuit suitable for the matrixing circuit 20 will be known to those skilled in the art. The subtractor 21 and the adder 25 may both comprise long tail pair circuits, the input signals being applied to the bases of the transistors, an output signal from the adder 25 being derived from the common emitter resistance and the output from the subtractor 21 being derived from the collector of that transistor the base of which is conneced to the matrixing circuit 20.

Although the invention has been described with reference to specific embodiments it is by no means limited to this embodiment. In particular other optical systems than that described may be used. In ordinary optics the colour tubes can be defocussed optically or electron-optically to produce the lower resolution signal.

What we claim is:

1. A colour television camera arrangement comprising means for producing at least two images of a scene, a luminance television pick-up tube which produces a brightness signal of relatively high resolution in response to one of said images, one or more other television pick-up tubes each responsive to a respective other one of said images to produce a plurality of signals representing colour components of the scene at relatively low resolution, means for combining said colour signals to produce a brightness signal of relatively low resolution, and means for subtracting from said high resolution signal a proportion of said low resolution signal of smaller amplitude than said high resolution signal, thereby to produce from said subtracting means an output brightness signal in which edges and transitions are emphasised.

2. An arrangement according to claim 1 wherein said subtracting means comprises a subtractor responsive to said high and low resolution signals both of the same amplitude to form a difference signal and an adder for adding to said high resolution signal a proportion of said difference signal.

3. An arrangement according to claim 2 wherein said difference signal is applied to a potentiometer having an adjustable tapping and said adder is connected to said tapping, whereby the proportion of said difference signal added to said high resolution signal may be adjusted.

4. An arrangement according to claim 1 wherein each said other image is optically defocussed, whereby each said other pick-up tube produces signals at relatively low resolution.

5. An arrangement according to claim 1 wherein said means for producing at least two images comprises a lens and means for separating central rays through said lens from the marginal rays through said lens, said central rays being used to form said one image and said marginal rays being used to form each other image.

6. An arrangement according to claim 1 wherein each of said one or more other television pick-up tubes is electron optically defocussed so as to produce signals at relatively low resolution.

References Cited

UNITED STATES PATENTS

| | | | |
|---|---|---|---|
| 2,865,984 | 12/1958 | Moe | 178—5.2 |
| 2,962,548 | 11/1960 | Taudt | 178—6.6 |
| 2,972,012 | 2/1961 | Farber | 178—5.2 |
| 3,196,205 | 7/1965 | Bedford | 178—5.4 |

JOHN W. CALDWELL, *Acting Primary Examiner.*

DAVID G. REDINBAUGH, *Examiner.*

J. A. O'BRIEN, *Assistant Examiner.*